United States Patent
Sheinfeld

(10) Patent No.: US 9,894,169 B2
(45) Date of Patent: Feb. 13, 2018

(54) SYSTEM AND METHOD FOR DISPLAYING CONTEXTUAL ACTIVITY STREAMS

(71) Applicant: MAINSOFT R&D LTD., Lod (IL)

(72) Inventor: Roy Sheinfeld, Tel Aviv (IL)

(73) Assignee: Harmon.ie R&D Ltd., Lod (IL)

( * ) Notice: Subject to any disclaimer, the term of this patent is extended or adjusted under 35 U.S.C. 154(b) by 244 days.

(21) Appl. No.: 13/900,045

(22) Filed: May 22, 2013

(65) Prior Publication Data

US 2014/0067951 A1    Mar. 6, 2014

Related U.S. Application Data

(60) Provisional application No. 61/696,314, filed on Sep. 4, 2012.

(51) Int. Cl.
*H04L 12/26* (2006.01)
*H04L 29/08* (2006.01)
*G06Q 50/00* (2012.01)

(52) U.S. Cl.
CPC .............. *H04L 67/22* (2013.01); *G06Q 50/01* (2013.01)

(58) Field of Classification Search
CPC .............................. H04L 67/22; G06Q 50/01
USPC ......................................................... 709/204
See application file for complete search history.

(56) References Cited

U.S. PATENT DOCUMENTS

| | | | |
|---|---|---|---|
| 7,577,916 B2 | 8/2009 | Pedersen et al. | |
| 7,822,604 B2 | 10/2010 | Amini et al. | |
| 8,495,709 B1 * | 7/2013 | Cooper et al. | 726/4 |
| 8,745,057 B1 * | 6/2014 | Li | 707/737 |
| 2006/0248087 A1 * | 11/2006 | Agrawal et al. | 707/10 |
| 2008/0103770 A1 | 5/2008 | Amini et al. | |
| 2012/0078870 A1 | 3/2012 | Bazaz | |
| 2012/0130862 A1 | 5/2012 | Tedjamulia et al. | |
| 2012/0143701 A1 | 6/2012 | Reis et al. | |
| 2012/0158494 A1 | 6/2012 | Reis et al. | |
| 2012/0203831 A1 | 8/2012 | Schoen et al. | |
| 2013/0103447 A1 | 4/2013 | Melander et al. | |
| 2013/0103757 A1 | 4/2013 | Mitchell et al. | |

* cited by examiner

*Primary Examiner* — Scott B Christensen
(74) *Attorney, Agent, or Firm* — M&B IP Analysts, LLC

(57) ABSTRACT

A method and system for generating contextual activity streams are provided. The method comprises receiving unstructured data collected by an agent operable on a client node from a plurality of data sources, wherein the collected unstructured data is of a user of the client node; analyzing the collected unstructured data to identify at least one tag in the collected unstructured data; determining a context of the collected unstructured data based in part on the at least one identified tag; creating a contextual activity stream; inserting contextual data items gathered from a plurality of social networks into the created contextual activity stream, wherein the contextual data items are data items shared by connections of the user and have a substantially similar context to the determined context; and causing a display of contextual data items in the contextual activity stream over the client node.

21 Claims, 3 Drawing Sheets

SYSTEM AND METHOD FOR DISPLAYING
CONTEXTUAL ACTIVITY STREAMS

CROSS REFERENCE TO RELATED
APPLICATIONS

This application claims the benefit of U.S. Provisional Application No. 61/696,314 filed on Sep. 4, 2012, the contents of which are herein incorporated by reference.

TECHNICAL FIELD

The invention generally relates to social networks, and more particularly to systems and methods for displaying activity streams from social networks.

BACKGROUND

Social networking platforms allow people to connect with other people who have at least a common interest. The vast growth in mobile technology has increased the popularity of social networking platforms by allowing people to chat with their friends anytime and from anywhere. An activity stream is a list of recent activities performed by one or more users. The implementation of an activity stream is commonly found in social networking platforms. An example is the news feed of Facebook®.

Though activity streams arise from social networking platforms, nowadays they have also become common in enterprise social networks. The implementation of an activity stream in an enterprise social network allows online interaction between the enterprise's employees. Furthermore, such implementation provides a cross-enterprise communication platform which enables a constant update of the enterprise's latest news.

However, such activity streams, especially in large enterprises, are commonly swamped with content received from a plurality of resources. For example, regulations updates inserted by a corporation's legal advisor may be displayed within the same activity stream as a human resource manager's notice related to a new employee in the sales division. Furthermore, content (announcements, news, etc.) posted for one division of an enterprise may not be useful for employees (users) in another division. As a result, the generation of activity streams as implemented in conventional enterprise social networks is inefficient for most employees trying to extract relevant information therefrom.

It would be therefore advantageous to provide a solution that would overcome the limitations of the prior art by generating activity streams which are automatically customized to the needs and interests of users' (employees), and in particular generation of such activity streams in enterprise social networks.

SUMMARY

Certain exemplary embodiments include a method for generating contextual activity streams are provided. The method comprises receiving unstructured data collected by an agent operable on a client node from a plurality of data sources, wherein the collected unstructured data is of a user of the client node; analyzing the collected unstructured data to identify at least one tag in the collected unstructured data; determining a context of the collected unstructured data based in part on the at least one identified tag; creating a contextual activity stream; inserting contextual data items gathered from a plurality of social networks into the created contextual activity stream, wherein the contextual data items are data items shared by connections of the user and have a substantially similar context to the determined context; and causing a display of contextual data items in the contextual activity stream over the client node.

Certain exemplary embodiments also include a server for generating contextual activity streams are provided. The server comprises a network interface communicatively connected to a network; a processor; a memory connected to the processor, the memory is configured to store instructions that when executed by the processor configure the server to: receive unstructured data collected by an agent operable on a client node from a plurality of data sources, wherein the collected unstructured data is of a user of the client node; analyze the collected unstructured data to identify at least one tag in the collected unstructured data; determine a context of the collected unstructured data based in part on the at least one identified tag; create a contextual activity stream; insert contextual data items gathered from a plurality of social networks into the created contextual activity stream, wherein the contextual data items are data items shared by connections of the user and having a substantially similar context to the determined context; and cause a display of contextual data items in the contextual activity stream over the client node.

BRIEF DESCRIPTION OF THE DRAWINGS

The disclosed subject matter is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
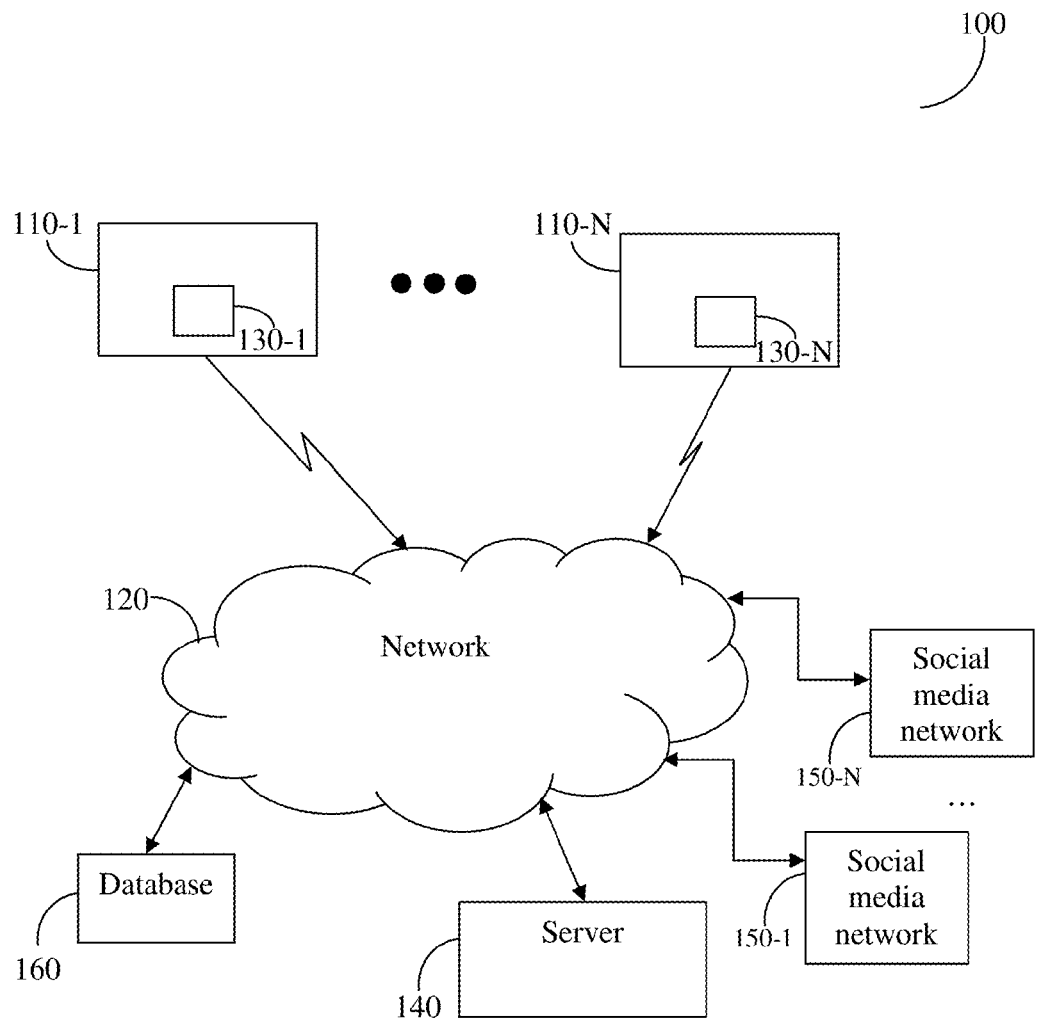
FIG. 1 is a schematic diagram of a network system utilized for illustrating the various disclosed embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments discussed herein include a system and method for generating and displaying a customized activity stream respective of a context. In one embodiment, the system analyzes unstructured data content and identifies one or more tags within the data content. Based, in part on the tags the system generates, the context of the data content is identified. The system then creates one or more customized activity streams respective of the context.

FIG. 1 depicts an exemplary and non-limiting block diagram of a network system 100 utilized to describe various disclosed embodiments. A plurality of client nodes 110-1 through 110-N, are communicatively connected to a network 120. The client nodes 110-1 through 110-N may be, for example, a personal computer, a tablet computer, a laptop computer, a smart phone, and so on. The network 120 may be wireless, cellular or wired, a local area network (LAN), a wide area network (WAN), a metro area network (MAN), the Internet, the worldwide web (WWW), like networks, and any combination thereof.

The system 100 further comprises agents 130-1 through 130-N respectively installed in the client nodes 110-1 through 110-N. Each of the agents 130-1 through 130-N may be implemented as an application program having instructions that reside in a memory of its respective client node. Each agent 130 is further communicatively connected to a server 140 over the network 120.

According to one embodiment, each agent 130 monitors data sources accessed by or through the respective client node 110. The data sources may include, but are not limited to, applications installed or operable on the client node or data sources with which the client 110 communicates. Examples for sources monitored by the agent 130 include without limitation, mail applications, document collaboration applications, chat applications, phone calls, video conferences, social networks, enterprise network applications (e.g., SharePoint), VoIP applications, calendars, contacts, text messaging applications, instant messaging applications, and the like. The applications considered as data sources may be locally installed on a client node or may be accessed by the client node.

Each agent 130 is further configured to collect unstructured data from the data sources. Unstructured data content may be a document, a message such as an email message, chat correspondence, SMS messaging, images, video clips, and combinations thereof. The unstructured data collected by each agent 130 is sent to the server 140. In an exemplary embodiment, the agent 130 is configured to monitor document collaboration activities such as, for example and without limitation, co-authoring of documents. The collected information is then aggregated by the agent 130 and sent to the server 140.

In one embodiment, the collected unstructured data is flattened, i.e., converted to a unified data format that can be analyzed, by the server 140, for the purpose of displaying activity streams. In another embodiment, the data is collected by the agent 130 over a predefined amount of time or until a predefined number of records are gathered, prior to sending the information to the server 140.

The server 140 is configured to analyze the received data as collected by each agent 130 to generate one or more contextual activity streams that may be of interest to a user of an agent 130. The generated activity streams displayed over the client node by means of a respective agent 130. For example, upon receiving the unstructured data from an agent 130-1, the server 140 is configured to analyze the received data, generate at least one contextual activity stream respective of the data analysis, and cause to the display of the activity stream over the client node 110-1. The agent 130-1 is configured to facilitate the communication between the respective client node 110-1 and the server 140.

In one embodiment, the agent 130 provides a graphical user interface in the client node 110. The graphical user interface includes a window displaying the various contextual activity streams and a search bar allowing the user to enter a search query for searching feeds in the displayed activity streams.

In order to generate and display contextual activity streams, the server 140 is configured to identify one or more tags from the collected unstructured data. Then, the server 140 is configured to determine the context of the received unstructured data content. The context is determined using the tags, parameters identifying the user, correlation of certain data items in the collected data, and so on. The process for determining the context of the collected data is discussed in detail above. The parameters identifying the user can be extracted from the collected unstructured data (e.g., an email signature) or based on a user's profile. An example for a user profile that be used herein can be found in co-pending U.S. application Der. No. 13/853,297 filed 29 Mar. 2013, assigned to the common assignee and incorporated herein by reference.

The server 140, based on the determined context, generates one or more activity streams. A contextual activity stream is comprised of a collection of feeds gathered from a plurality of different social networks 150-1 through 150-N to which a user of an agent 130 is subscribed. In an embodiment, at least one of the social networks 150-1, 150-N is an enterprise network of an enterprise to which the user is related. Feeds including a contextual activity stream have a substantially similar context as the context determined by the server 140. In one embodiment, the activity stream comprises a search query that enables a user to determine the context displayed in the activity stream.

Figure 2:
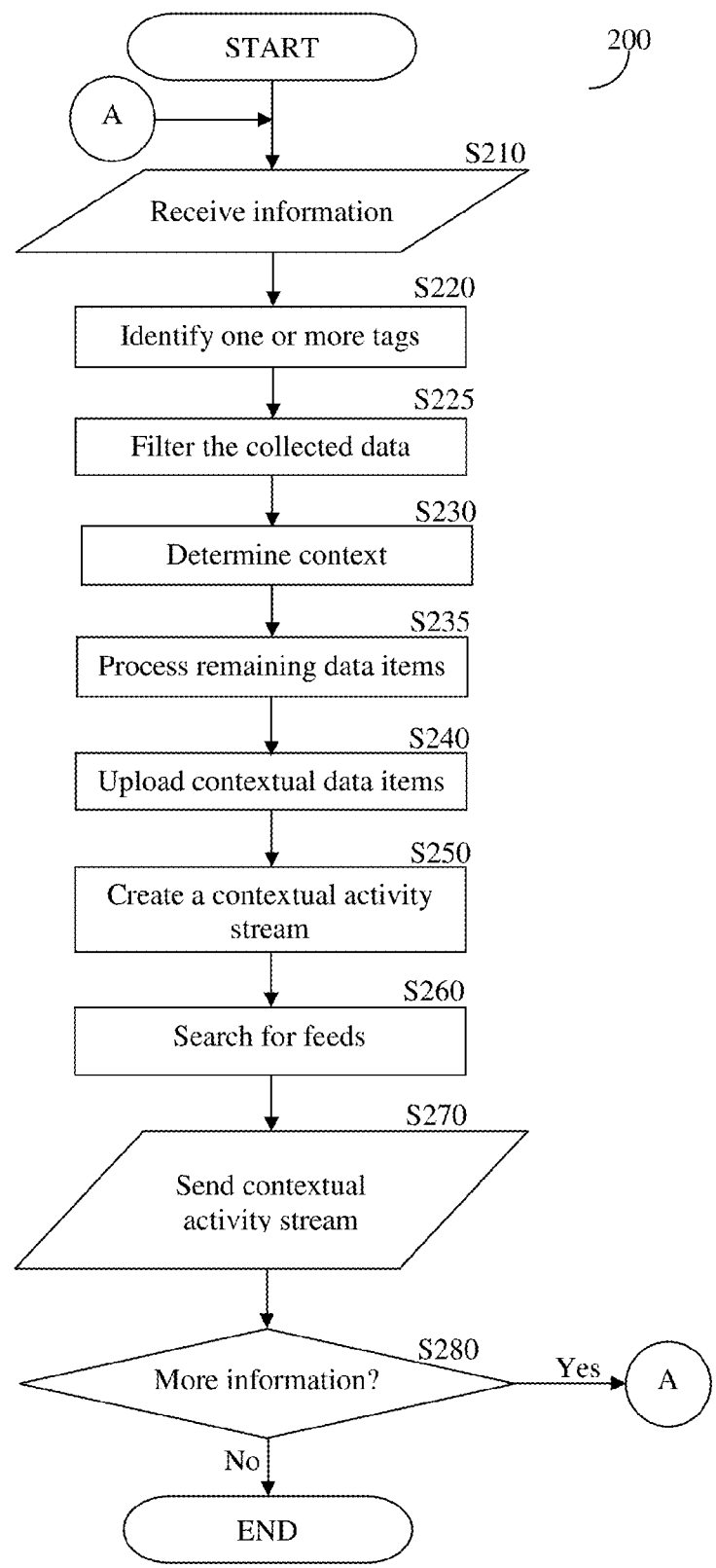
FIG. 2 is a flowchart describing a method for generating contextual activity streams according to one embodiment.

FIG. 2 depicts an exemplary and non-limiting flowchart 200 describing a method for generating contextual activity streams according to one embodiment. The method can be performed by the server 140. The method will be described with a reference to a single agent 130 (e.g., agent 130-1) executed over a client node 110 (e.g., agent 110-1) merely for the sake of simplicity of the description.

In S210, unstructured data from a plurality of data sources as collected by the agent 130-1 is received at the server 140. In S220, one or more tags are identified in the received data. A tag is a predetermined index assigned to a textual term. It should be noted that one or more tags can be generated for the same term. A term may be a search query provided by a user of a client node 110. In one embodiment, S220 includes performing textual analysis to identify one or more terms preloaded from a database, and searching through the collected data for the appearances of the preloaded terms. In S225, data items in the collected unstructured data in which tags could not be identified are filtered out. The remaining data items are later processed by the server 140.

In S230, the context of the remaining data items is determined. According to one embodiment, the analysis of the tags includes a determination of whether a predefined term appears in the collected data above a certain threshold and if so, the context of the remaining data items is determined respective thereto.

In one embodiment, the contents of the remaining data items are correlated with the identified tags to determine the context. For example, if an identified tag is 'acquisition' and the correlation of the data items indicates 'contracts', then the context of the data items is determined to be 'legal' and/or 'acquisition legal transaction'.

In another embodiment, the identified tags are correlated with the parameters identifying the user in order to determine the context. Such parameters may be, for example, the user's company name, title, location, etc. For example, if an identified tag is 'Mobile Apps' and the user's title is 'VP Research & Development', the context of the remaining data items can be determined to be 'software development'. It should be noted that the identified tags and the users' parameters can be further correlated with the contents of the remaining data items.

In S235, the remaining data items are further processed to detect those items that comply with the determined context. Such items are referred to hereinafter as contextual data items.

In S240, the contextual data items are uploaded to the one or more social networks 150-1, 150-N, so that such items can be shared with the user's connections (e.g., "friends" and/or "colleagues") across the social networks 150-1, 150-N.

In S250, a contextual activity steam is created for a user and contextual data items are inserted into the created activity stream. In addition, in S260, a search is made of social networks 150-1, 150-N for feeds (data items) shared by other users and matched to the determined context. Such feeds are also added to the created activity stream. A data item inserted into the contextual activity stream may include the actual item in its unstructured data form, or a link thereto.

In S270, the contextual activity stream is sent to the agent 130-1 for display on the client node 110-1. The agent 130-1 generates an interface on the display of the client node 110-1 for the display of the streams. In S280 it is checked whether additional information is collected and if so, execution continues with S210; otherwise, execution terminates.

Figure 3:
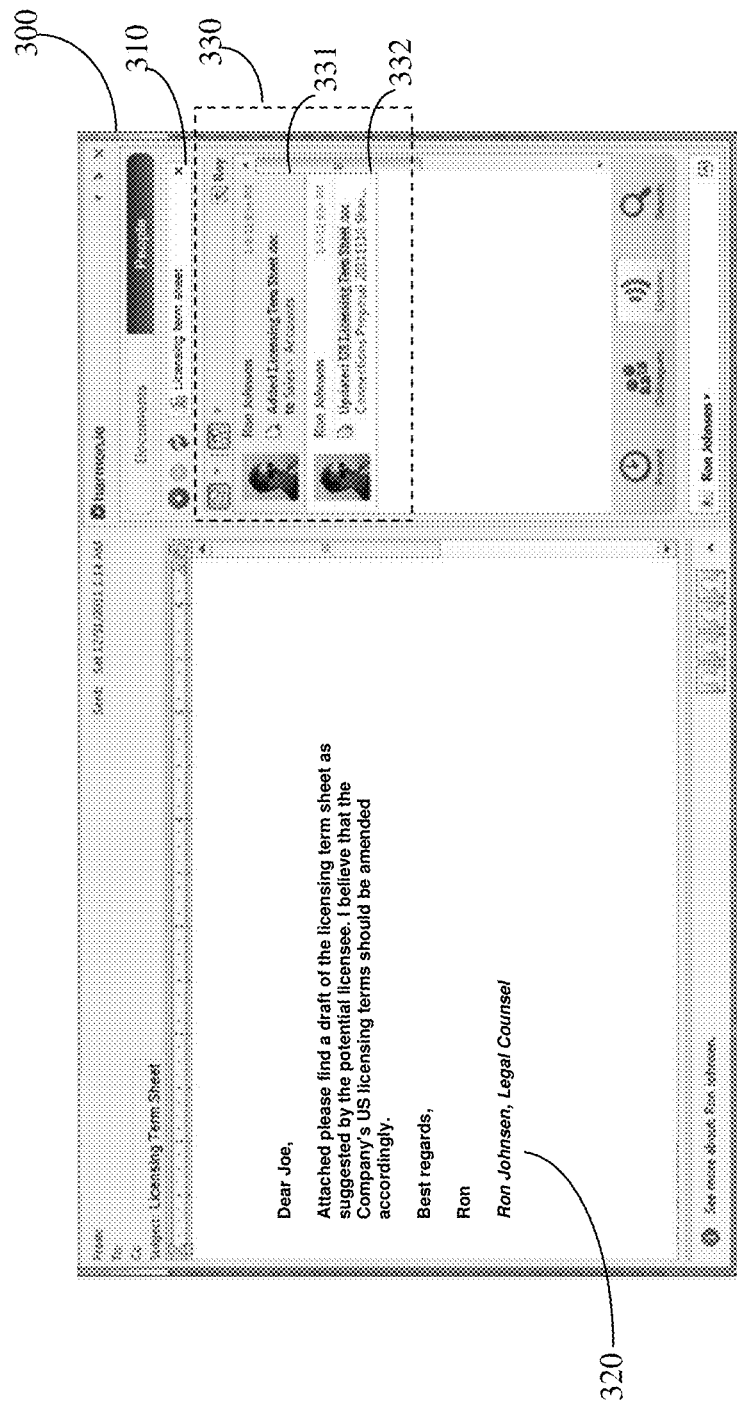
FIG. 3 is a screenshot of the display of a contextual activity stream generated according to one embodiment.

FIG. 3 depicts an exemplary and non-limiting screenshot 300 of a contextual activity stream 330 displayed on a client node according to one embodiment. The term "licensing term sheet" is received as a search query 310. The server 140 identified the tags "licensing term sheet" and "US licensing term sheet" from the content of a document 320. The analysis of the document 320 with the identified tags determines that the context is "licensing term sheet". Therefore, the contextual data items 331 through 332 included in the stream 330 are all related to "licensing term sheet". Some of the data items 331 through 332 include a link to files referenced in the document 320. Upon identification of additional appropriate unstructured data content, the additional appropriate unstructured data content appears in an appropriate activity stream.

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another appropriate graphical user interface of an internet mobile application, either generic or tailored for the purposes described in detail hereinabove.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for generating contextual activity streams, comprising:

receiving, over a network at a server, unstructured data collected by an agent operable on a client node from a plurality of data sources, wherein the collected unstructured data is collected with respect to a user of the client node;

receiving, by the server, at least one textual term, each textual term being associated with at least one tag, wherein each textual term is capable of being associated with multiple tags;

analyzing, by the server, the collected unstructured data to identify a plurality of tags in the collected unstructured data, wherein each of the identified tags is associated with at least one of the received at least one textual term;

determining, by the server, a context of the collected unstructured data based in part on the identified plurality of tags;

creating, by the server, a contextual activity stream based on the determined context, wherein the contextual activity stream includes the analyzed unstructured data in compliance with the determined context to be provided to the client node;

inserting, by the server, contextual data items gathered from a plurality of social networks into the created contextual activity stream, wherein the inserted contextual data items are additional data items shared by connections of the user, wherein each inserted contextual data item has a context that is in compliance with the determined context; and causing a display, on the client node, of the contextual activity stream including the inserted contextual data items.

2. The method of claim 1, wherein the contextual data items further include at least one link to at least a portion of the received unstructured data.

3. The method of claim 1, where the plurality of tags is provided in a search query.

4. The method of claim 1, wherein analyzing the collected unstructured data to identify a plurality of tags further comprises:

performing textual analysis to identify appearances of each of the plurality of tags in the collected unstructured data.

5. The method of claim 1, wherein determining the context of the collected unstructured data further comprises:

filtering, based on the analysis, out data items in the collected unstructured data in which none of the plurality of tags are identified; and correlating the plurality of tags with at least one of the remaining data items and parameters identifying the user, wherein the correlation result provides the context.

6. The method of claim 5, further comprising:
processing the remaining data items to detect data items having a context in compliance with the determined context, thereby resulting in the contextual data items.

7. The method of claim 6, further comprising:
sharing the contextual data items with the connections across the plurality of social networks.

8. The method of claim 6, wherein the plurality of social networks includes at least an enterprise social network of an enterprise related to the user.

9. The method of claim 1, wherein each of the plurality of data sources is any one of: a mail application, a chat application, a phone call application, a video conferencing application, a social network, and an enterprise network.

10. The method of claim 9, wherein the unstructured data includes at least one of: a document, an email message, a chat correspondence, and a short message service message.

11. A non-transitory computer readable medium having stored thereon instructions for causing one or more processing units to execute the computerized method according to claim 1.

12. A server for generating contextual activity streams, comprising:
a network interface communicatively connected to a network;
a processor;
a memory connected to the processor, the memory is configured to store instructions that when executed by the processor configure the server to:
receive, over the network, unstructured data collected by an agent operable on a client node from a plurality of data sources, wherein the collected unstructured data is collected with respect to a user of the client node;
receive at least one textual term, each textual term being associated with at least one tag, wherein each textual term is capable of being associated with multiple tags;
analyze the collected unstructured data to identify a plurality of tags in the collected unstructured data, wherein each of the identified tags is associated with at least one of the received at least one textual term;
determine a context of the collected unstructured data based in part on the identified plurality of tags;
create a contextual activity stream based on the determined context, wherein the contextual activity stream includes the analyzed unstructured data in compliance with the determined context to be provided to the client node;
insert contextual data items gathered from a plurality of social networks into the created contextual activity stream, wherein the inserted contextual data items are additional data items shared by connections of the user, wherein each inserted contextual data item has a context that is in compliance with the determined context; and
cause a display, on the client node, of the contextual activity stream including the inserted contextual data items.

13. The server of claim 12, wherein the contextual data items further include at least one link to at least a portion of the received unstructured data.

14. The server of claim 12, wherein the tag is provided in a search query.

15. The server of claim 12, wherein the server is further configured to
perform textual analysis to identify appearances of each of the plurality of tags in the collected unstructured data.

16. The server of claim 12, wherein the server is further configured to:
filter, based on the analysis, out data items in the collected unstructured data in which none of the plurality of tags are identified; and
correlate the plurality of tags with at least one of the remaining data items and parameters identifying the user, wherein the correlation result provides the context.

17. The server of claim 16, wherein the server is further configured to:
process the remaining data items to detect data items having a context in compliance with the determined context, thereby resulting in the contextual data items.

18. The server of claim 17, wherein the server is further configured to:
share the contextual data items with the connections across the plurality of social networks.

19. The server of claim 17, wherein the plurality of social networks includes at least an enterprise social network of an enterprise related to the user.

20. The server of claim 12, wherein each of the plurality of data sources is any one of: a mail application, a chat application, a phone call application, a video conferencing application, a social network, and an enterprise network.

21. The server of claim 20, wherein the unstructured data includes at least one of: a document, an email message, a chat correspondence, and a short message service message.

* * * * *